United States Patent
Ferguson et al.

(10) Patent No.: US 7,745,556 B2
(45) Date of Patent: Jun. 29, 2010

(54) POLYMERISATION OF VINYL CHLORIDE MONOMER

(75) Inventors: Paul A Ferguson, Cheshire (GB); Jill Galligan, Cheshire (GB); Raymond J Harvey, Cheshire (GB)

(73) Assignee: Ineos Technologies (Vinyls) Limited, Hampshire (GB)

( * ) Notice: Subject to any disclaimer, the term of this patent is extended or adjusted under 35 U.S.C. 154(b) by 236 days.

(21) Appl. No.: 11/792,085

(22) PCT Filed: Dec. 14, 2005

(86) PCT No.: PCT/GB2005/004823
§ 371 (c)(1),
(2), (4) Date: Jul. 6, 2007

(87) PCT Pub. No.: WO2006/064226
PCT Pub. Date: Jun. 22, 2006

(65) Prior Publication Data
US 2009/0137744 A1 May 28, 2009

(30) Foreign Application Priority Data
Dec. 14, 2004 (GB) ................. 0427390.0

(51) Int. Cl.
*C08F 114/06* (2006.01)
*C08F 2/20* (2006.01)
(52) U.S. Cl. .............. 526/344.2; 526/201; 526/202; 526/344; 525/223; 525/244; 525/231; 525/523; 525/331.5; 524/523
(58) Field of Classification Search .......... 525/223, 525/231, 331.5; 524/523; 526/344, 344.2, 526/201, 202
See application file for complete search history.

(56) References Cited

U.S. PATENT DOCUMENTS

| 4,323,661 | A | | 4/1982 | Kraus et al. | |
|---|---|---|---|---|---|
| 4,345,056 | A | | 8/1982 | Thyret et al. | |
| 4,579,923 | A | * | 4/1986 | Murray | 526/209 |
| 4,670,490 | A | * | 6/1987 | Yoshida et al. | 524/115 |
| 4,956,222 | A | * | 9/1990 | Matsuura et al. | 428/212 |
| 5,155,189 | A | * | 10/1992 | Skillicorn et al. | 526/199 |
| 5,244,995 | A | * | 9/1993 | Skillicorn et al. | 526/340 |
| 5,780,196 | A | * | 7/1998 | Fujiwara et al. | 430/137.19 |
| 6,495,623 | B1 | * | 12/2002 | Tanimoto et al. | 524/459 |

FOREIGN PATENT DOCUMENTS

| DE | 216 244 A1 | | 12/1984 |
|---|---|---|---|
| EP | 0 167 084 A2 | | 1/1986 |
| EP | 0 323 197 A1 | | 7/1989 |
| EP | 0 483 051 A1 | | 4/1992 |
| EP | 152 032 A1 | | 11/2001 |
| EP | 0 897 953 B1 | | 7/2003 |
| JP | 2004027189 A | * | 1/2004 |
| WO | WO 9708212 A1 | * | 3/1997 |

OTHER PUBLICATIONS

Derwent abstract of Fiedler et al. (DD 216244).*
English abstract of Knoll (EP 0,167,084).*
Machine Translation of JP2004-027189.*
Braun et al. Die Angewandte Makromolekulare Chemie 1999, 268, 81-86.*

* cited by examiner

*Primary Examiner*—Vasu Jagannathan
*Assistant Examiner*—Mark S Kaucher
(74) *Attorney, Agent, or Firm*—Nixon & Vanderhye

(57) ABSTRACT

A copolymer of (i) an alkyl acrylate or alkyl methacrylate and (ii) a hydroxyalkyl acrylate or hydroxyalkyl methacrylate is used as a secondary protective colloid in the suspension polymerization of vinyl chloride monomer. The alkyl group of the alkyl acrylate or alkyl methacrylate is preferably a 2-ethylhexyl group. The hydroxyalkyl group of the hydroxyalkyl acrylate or hydroxyalkyl methacrylate is preferably a hydroxyethyl group.

10 Claims, No Drawings

POLYMERISATION OF VINYL CHLORIDE MONOMER

This application is the U.S. National Phase of International Application PCT/GB2005/004823, filed 14 Dec. 2005, which designated the U.S. PCT/GB2005/004823 claims priority to British Application No. 0427390.0 filed 14 Dec. 2004. The entire content of these applications are incorporated herein by reference.

This invention relates to the suspension polymerization of vinyl chloride monomer (VCM), and more particularly to the use in such polymerization of an improved secondary protective colloid.

BACKGROUND OF THE INVENTION

Polyvinyl chloride (PVC) is one of the largest volume commodity thermoplastics manufactured industrially. More than 75% of PVC is made using suspension polymerisation technology. The final physical form or morphology of the polymer is determined by a combination of factors in the polymerisation process. Two characteristics of the product which are particularly important are the particle size and the porosity of the particles.

If the particle size is too low or too high, subsequent processing of the polymer to form molded or extruded articles is made more difficult. It is therefore particularly desirable for most applications to produce PVC particles with a mean grain size of the order of 100 to 200 μm, and a narrow particle size distribution such that no more than a small percentage of particles are smaller than 63 μm or larger than 250 μm.

High porosity is important, because it facilitates the removal of unreacted VCM from the PVC particles. VCM is a known carcinogen, and the industry is therefore continually attempting to reduce the level of monomer to well below 1 ppm in the final resin. In the case of PVC-based foils for medical applications, residual monomer levels less than 50 ppb are required. High porosity means that unreacted VCM can be removed efficiently from the particles at lower temperatures, thus avoiding problems of thermal degradation of the PVC at higher temperatures. High porosity also facilitates the subsequent introduction of processing additives (such as plasticisers) into the particles.

To a large extent, the final particle size and the amount of porosity in the polymer is determined by the polymerisation temperature, the prevailing agitation conditions in the polymerisation reactor, and by the use of certain additives which are variously referred to as "dispersants" or "protective colloids".

Protective colloids are categorised as either primary or secondary types. Primaries are largely responsible for the control of the size of the polymer particles and secondaries are largely responsible for controlling the porosity of the polymer particles. Primary protective colloids are typically water soluble polymers based on substituted cellulose ethers and/or high molecular weight partially hydrolysed polyvinyl acetates (PVA). Commercially used secondary protective colloids are predominantly based on lower molecular weight partially hydrolysed PVA, and to a lesser extent surfactant technology.

The PVC industry is continually seeking to improve the suspension polymerisation process with the aim of improving polymer quality and improving the economics of production. The present invention overcomes some of the limitations of the existing commercially available secondary protective colloid technology.

The partially hydrolysed PVAs which are used in the majority of industrial applications as secondary protective colloids are manufactured in a two stage process. In the first stage, vinyl acetate is polymerized to PVA. In the second stage, the PVA is partially hydrolysed to form a polyvinyl acetate—polyvinyl alcohol copolymer. The particular polymerization conditions used in the first stage have a profound effect on the properties of the final product, including higher order polymer characteristics such as the level of unsaturation, conjugated unsaturation, chain branching and the nature of end groups. The properties of the final product are also dependent on the hydrolysis method. For example, base hydrolysis leads to products having a "blocky" structure, i.e. polymers having sequences of hydroxyl groups interspersed among sequences of pendent acetate groups. Acid hydrolysis, on the other hand, leads to randomly hydrolysed polymers.

As a result of the different manufacturing methods used, commercially available PVA protective colloid products which are reported to have nominally the same physical and chemical properties (measured by typical standard quality control methods, such as the degree of hydrolysis, solution viscosity etc.), can actually behave very differently in the suspension polymerisation process. This, in turn, leads to undesired variability in the resulting PVC product. It is therefore an aim of the present invention to provide secondary protective colloids which can be manufactured by a simplified process, resulting in reduced variability in its properties.

According to EP-A-0446747, the preferred acetate distribution for improved PVC internal structural homogeneity is found using PVA based protective colloids with a block like structure. However these products have a relatively small share of the secondary protective colloids market as they tend to exert a very strong primary effect in the suspension polymerization process, resulting in unacceptably low particle size PVC. It is therefore a further aim of the present invention to provide the improved PVC internal structural homogeneity characteristic of blocky PVAs, while maintaining a sufficiently high average particle size to produce commercial quality PVC.

The efficiency with which a secondary protective colloid introduces porosity into the PVC is significantly affected by the temperature at which the polymerisation is carried out. In practice, the porosity of the polymer is inversely proportional to the polymerisation temperature when all other polymerisation variables are kept constant. Low K value polymers prepared at high polymerisation temperatures generally have low porosity. It is therefore a still further aim of the present invention to provide secondary protective colloids which can produce high porosity at high polymerisation temperatures.

A major concern for PVC manufacturers is the quality of the PVC's initial colour once it has been formulated into a melt state. A number of process variables are known to influence the initial colour, including the choice of additives used during the suspension polymerization process. Intense research efforts have been focused on understanding the factors which contribute to PVC thermal stability, with little regard to the inherent thermal stability of the protective colloid. In the industrial manufacture of PVA based protective colloids, great care must be taken to avoid burning the PVA particularly during the stripping stage to remove residual vinyl acetate monomer. Poor vinyl acetate stripping can result in dark or black contamination in the final protective colloid product. A further aim of this invention is therefore to provide secondary protective colloids with improved thermal stability compared to current technology.

Acrylic based polymers have been developed which act as primary protective colloids in the suspension polymerisation of vinyl chloride. U.S. Pat. No. 4,104,457 describes acrylic acid copolymers to control particle size in bulk vinyl chloride polymerisations. U.S. Pat. No. 4,603,151 and U.S. Pat. No. 4,684,668 describe the use of cross-linked acrylic acid primary protective colloids which act as thickening agents. WO97/08212 describes the use of high molecular weight (>100000) acrylic dispersants which have a cloud point above the polymerisation temperature. These polymers are stated to act as primary colloids when cross-linked, and as secondary protective colloids when not cross-linked. The use of high molecular weight acrylic acid copolymers generally requires the addition of a base to the suspension polymerisation process to neutralise the acrylic acid. It is therefore an aim of the present invention to provide protective colloids which do not require neutralisation in the suspension polymerisation process.

EP-A-0483051, U.S. Pat. No. 5,155,189 and U.S. Pat. No. 5,244,995 describe the use of relatively low molecular weight polymers in suspension polymerization processes. The claimed additives are based on homo or copolymers containing more than 50% by weight of $\alpha,\beta$-unsaturated ester(s) of acrylic acid and/or methacrylic acid having no ionic side groups. It is stated that terminal functional groups can be added to improve performance. These materials can be shown to act as secondary protective colloids increasing the porosity of the final PVC when compared to PVC produced without a secondary protective colloid. However, as described in WO97/08212, the use of low molecular weight polyacrylate colloids requires the use of a primary colloid, PVA, having a comparatively low (e.g. 72.5%) degree of hydrolysis. It is known that primary colloids of this type tend to increase porosity when compared to higher molecular weight/higher hydrolysis primary colloids. The application of acrylic secondary protective colloids of the type described in EP-A-0483051 is therefore of limited industrial value, as it restricts the choice of primary colloid to low molecular weight primaries. Industrially it is desirable to have a free choice of primary colloid to include higher hydrolysis primaries, non PVA-based primaries and mixtures of primaries in order optimise the polymerisation process. It is therefore an additional aim of the present invention to provide secondary protective colloids which can be used with a wide range of primary colloid types.

U.S. Pat. No. 4,579,923 describes the use of a monomeric hydroxy alkyl acrylate/propylene oxide adduct added at the start of PVC polymerisation to provide steric stabilisation of primary particles, hence producing porosity. Industrially, VCM polymerisations are not allowed to proceed to 100% conversion as the thermal stability of the resulting PVC is adversely affected at very high conversion. Therefore some unreacted VCM is always recycled back into the suspension polymerisation process. If a second unreacted monomer is present in the recycled VCM, expensive equipment to purify the monomer may be necessary to ensure a consistent high quality PVC product. Moreover, it is known that the addition of even small amounts of free monomers into the suspension polymerisation process can significantly retard the rate of polymerisation and although this can be compensated by the use of more initiator, economically it is not favoured. It is therefore a still further aim of the present invention to provide secondary protective colloids which have little or no effect on the polymerisation kinetics, and which do not represent a contaminant in the recycled VCM.

Suspension PVC production is a batch process and major developments in the last few years have focussed on improving the productivity of the polymerisation reactors. The process of making PVC can be split into the actual time polymerising VCM, referred to as the reaction time, and the time taken to charge and discharge the reactor, referred to as the non-reaction time. One way in which the non-reaction time can be reduced is to charge the reactor with hot water to reduce the non-reaction time. It is therefore an additional aim of the present invention to provide secondary protective colloids which can be used in hot water charge processes.

It is now common practice for large PVC reactors to remove significant amounts of heat of polymerisation via a reflux condenser. This increases the efficiency of the reaction and therefore reduces reaction time. However, as US patent application US 2003/0162927 states, the time at which the condenser is effectively turned on can have a detrimental effect on the quality of the PVC, generally increasing the particle size distribution to an unacceptable level. It is therefore a still further aim of the present invention to provide secondary protective colloids which provide improved particle size stability early on in the polymerization, thus allowing higher rates of heat removal via a reflux condenser, even from the start of reaction.

SUMMARY OF THE INVENTION

According to one aspect of the present invention, a copolymer of (i) an alkyl acrylate or alkyl methacrylate and (ii) a hydroxyalkyl acrylate or hydroxyalkyl methacrylate is used as a secondary protective colloid in the suspension polymerization of vinyl chloride monomer.

In a further aspect, the present invention provides a polyvinyl chloride resin containing a copolymer of (i) an alkyl acrylate or alkyl methacrylate and (ii) a hydroxyalkyl acrylate or hydroxyalkyl methacrylate.

In a still further aspect, the present invention provides a polyvinyl chloride resin having a K value of 60 or less, a cold plasticiser absorption value of 20% or greater (more preferably 25% or greater), and a ratio of median grain size (MGS): grain size spread (GSS) in the range 1.6-2.5. K value, which is related to molecular mass, is determined by the method described in ISO 1628-2-1998 "Determination of the viscosity of polymer in dilute solution using capillary viscometers. Part 2 PVC resins". This method describes the values measured in cyclohexanone at a concentration of 5 g/L, and K value is calculated as follows:

$$K = \frac{1.5\log nr - 1 + \sqrt{1 + \left(\frac{2}{c} + 2 + 1.5\log nr\right)1.5\log nr}}{150 + 300c} \times 1000$$

where nr=PVC solution flow time/solvent flow time (both in seconds), and c=concentration of PVC solution in g per ml.

Cold plasticiser absorption value (CPA) is determined in accordance with ISO4608 "Homopolymer and copolymer resins of vinyl chloride for general use. Determination of plasticiser absorption at room temperature". The method determines the quantity of plasticiser absorbed by the resin at room temperature to give a dry mixture, and the results indicate the usefulness of a resin for the manufacture of dry blends.

DETAILED DESCRIPTION OF PREFERRED EMBODIMENTS

The secondary protective colloids used in the present invention are copolymers of (i) an alkyl acrylate or alkyl methacrylate and (ii) a hydroxyalkyl acrylate or hydroxyalkyl methacrylate, which may be prepared by standard methods in the art, such as those described in "The Encyclopaedia of Chemical Technology" Volume 1, 4th Edition (Kirk Othmer, Wiley Interscience). Most usually, such copolymers are prepared in solution to aid in the control of the molecular weight. In addition a chain transfer reagent can be used to further control the molecular weight of the resulting copolymer.

Preferred copolymers have a peak average molecular weight (Mp) of from 5000 to 50000, preferably from 6000 to 20000, and most preferably from 8000 to 14000. Peak average molecular weight is determined by reversed phase liquid chromatography. Briefly, the method involves gel permeation chromatography at 35° C. using THF as solvent, and polystyrene standards as calibrants.

The alkyl moiety in the alkyl acrylate or methacrylate is preferably a $C_1$ to $C_{20}$ alkyl group, which may be a straight chain or branched. More preferably, the alkyl group is a $C_2$ to $C_{20}$ up. Particularly preferred are $C_3$ to $C_{16}$ alkyl groups, such as n-butyl, i-butyl, pentyl, hexyl, heptyl, octyl, nonyl, decyl, undecyl and dodecyl groups. Most preferred are 2-ethylhexyl acrylate and 2-ethylhexyl methacrylate.

It will be understood that the copolymer may comprise more than one, e.g. two or three, different alkyl acrylates or alkyl methacrylates having different alkyl groups.

The hydroxyalkyl moiety in the hydroxyalkyl acrylate or methacrylate is preferably a $C_1$ to $C_6$ hydroxyalkyl group, and more preferably a $C_1$ to $C_4$ hydroxyalkyl group. 2-Hydroxyethylacrylate and 2-hydroxymethacrylate are particularly preferred.

The copolymer may comprise more than one, e.g. two or three, different hydroxyalkyl acrylates or hydroxyalkyl methacrylates having different hydroxyalkyl groups.

The copolymers used in the present invention will generally comprise from 20% to 80% by weight of alkyl acrylate or methacrylate moieties, with the balance being hydroxyalkyl acrylate or methacrylate moieties. However, it is possible to include minor amounts (generally less than 20% by weight, preferably less than 10% by weight, and most preferably less than 5% by weight) of other monomers which can be radically polymerized with (meth)acrylate monomers. Such other monomers include styrene, vinyl chloride monomer, vinylidene chloride, acrylonitrile, butadiene and isoprene.

Preferably, the copolymers of the invention comprise from 20% to 80% by weight of alkyl acrylate or methacrylate moieties and from 80% to 20% by weight of hydroxyalkyl acrylate or methacrylate moieties, more preferably from 20% to 50% by weight of alkyl acrylate or methacrylate moieties and from 80% to 50% by weight of hydroxyalkyl acrylate or methacrylate moieties, e.g. from 25% to 50% by weight of alkyl acrylate or methacrylate moieties and from 75% to 50% by weight of hydroxyalkyl acrylate or methacrylate moieties.

The above-described secondary protective colloids are used in the suspension polymerization of vinyl chloride monomer to form particulate polyvinyl chloride homopolymers or copolymers. Such polyvinyl chloride copolymers generally comprise less than 50% by weight, and preferably less than 20% by weight of comonomers other than VCM. Comonomers which may be used include acrylic acid, methacrylic acid, acrylic acid esters, methacrylic acid esters, acrylamides, vinyl esters such as vinyl acetate, vinyl ethers, and the like.

The secondary protective colloids are generally used in an amount of from 50 to 2000 ppm by weight of monomer, preferably from 100 to 1500 ppm, and most preferably from 200 to 1000 ppm. A mixture of two or more secondary protective colloids may be used if desired.

At least one primary protective colloid will generally also be used. Suitable primary protective colloids include partially hydrolysed PVA, cellulose derivatives such as methyl cellulose and hydroxypropyl methyl cellulose, calcium phosphate, gelatin, starch, poly vinyl pyrrolidone and vinyl ethers. Partially hydrolysed PVA and cellulose ethers are particularly preferred. Partially hydrolysed PVA primary protective colloids typically have a molecular weight of from 50000 to 250000, more usually from 75000 to 200000, and a degree of hydrolysis of from 70% to 90%, e.g. from 75% to 90%.

In preferred embodiments, the suspension polymerization is carried out under conditions to give high productivity, which would cause an unacceptable deterioration in the morphology of the resulting PVC if conventional secondary protective colloids were used. For example, use of the secondary protective colloids of the invention permits the greater use of a reflux condenser (or equivalent means) to remove heat from the reaction. This allows higher rates of reaction for a given reaction temperature, or lower reaction temperatures for a given reaction time.

In particularly preferred embodiments, from 60 to 100%, more preferably 80 to 100%, of the heat of the reaction is removed via a condenser. In contrast to prior art processes, heat removal may begin at a very early stage in the reaction. For example, heat removal may begin at less than 15% monomer conversion, and preferably at less than 10% (e.g. 5%) monomer conversion. It is especially preferred to begin partial heat removal via a condenser from the start of the reaction.

The secondary protective colloids of the invention are also suitable for use in hot water charge processes. In general, the temperature of the water charge in such processes lies between 60° and 120° C., and more preferably between 70° and 90° C.

EXAMPLES

Protective Colloid A

A copolymer of 2-ethylhexyl acrylate and 2-hydroxyethyl acrylate was prepared by polymerising in an alcoholic solvent, 38 weight % 2-ethylhexyl acrylate and 62 weight % 2-hydroxyethyl acrylate with Mp=17000 Daltons. The volume of solvent used was approximately double the total monomer volume. Initiators bis(4-tert-butylcyclohexyl) peroxydicarbonate and dilauroyl peroxide (0.45 weight percent on total monomer weight) and mercaptoethanol (1.6 weight percent on total monomer weight) was added as chain transfer reagent. The polymerisation was started by heating to 75° C. (and controlled ±5° C.) and continued for a minimum of 3 hours. After maintaining the reaction at temperature the resulting copolymer product which was in the form of a mobile liquid was cooled to room temperature. No further purification was necessary before use in suspension polymerisation experiments.

Protective Colloid B

A copolymer was prepared by solution, free radical initiated polymerisation containing 38 weight % 2-ethylhexyl acrylate and 62% 2-hydroxyethyl acrylate with Mp=12000 Daltons. A suitable chain transfer agent was used to control the molecular weight.

The reaction was allowed to proceed to high conversion. The subsequent copolymer solution was used directly in the suspension polymerisation of PVC without further purification.

Protective Colloid C

As B, except only 2-ethylhexyl acrylate was used to prepare a homopolymer. Mp=4500 Daltons.

Protective Colloid D

As B, except only 2-hydroxyethyl acrylate was used to prepare a homopolymer. Mp not reported; not soluble in THF to measure by GPC.

Protective Colloid E

As A, except that methyl acrylate and 2-hydroxyethyl acrylate (78% by weight) were used to prepare the copolymer. Mp=12000 Daltons.

Protective Colloid F

As A, except that ethyl acrylate and 2-hydroxyethyl acrylate (75% by weight) were used to prepare the copolymer. Mp=16500 Daltons.

Protective Colloid G

As A, except that n-butyl acrylate and 2-hydroxyethyl acrylate (71% by weight) were used to prepare the copolymer. Mp=15000 Daltons.

Protective Colloid H

As A, except that iso-butyl acrylate and 2-hydroxyethyl acrylate (71% by weight) were used to prepare the copolymer. Mp=20000 Daltons.

Protective Colloid I

As A, except that lauryl acrylate and 2-hydroxyethyl acrylate (56% by weight) were used to prepare the copolymer. Mp=18000 Daltons.

Protective Colloid J

A copolymer was prepared by solution, free radical initiated polymerisation containing 27 weight % n-butyl acrylate and 73% 2-hydroxyethyl methacrylate with Mp=15000 Daltons. A suitable chain transfer agent was used to control the molecular weight.

The reaction was allowed to proceed to high conversion. The subsequent copolymer solution was used directly in the suspension polymerisation of PVC without further purification.

Protective Colloid K

A copolymer was prepared by solution, free radical initiated polymerisation containing 35 weight % 2-ethylhexyl acrylate and 65% 2-hydroxyethyl methacrylate with Mp=15000 Daltons. A suitable chain transfer agent was used to control the molecular weight.

The reaction was allowed to proceed to high conversion. The subsequent copolymer solution was used directly in the suspension polymerisation of PVC without further purification.

Protective Colloid L

A copolymer was prepared by solution, free radical initiated polymerisation containing 30 weight % n-butyl acrylate and 70% 2-hydroxyethyl methacrylate with Mp=14600 Daltons. A suitable chain transfer agent was used to control the molecular weight.

The reaction was allowed to proceed to high conversion. The subsequent copolymer solution was used directly in the suspension polymerisation of PVC without further purification.

Protective Colloid M

As B, except containing 61 weight % 2-ethylhexyl acrylate and 39% 2-hydroxyethyl acrylate with Mp=10500 Daltons.

Protective Colloid N

As B, except containing 8 weight % 2-ethylhexyl acrylate and 92% 2-hydroxyethyl acrylate with Mp=12000 Daltons.

Suspension Polymerization of VCM

Suspension polymerisations were carried out in pilot plant scale reactors of 160 litre and 250 litre capacity fitted with turbine type or Pfaudler type agitators. Vinyl chloride monomer was production grade monomer supplied by EVC (UK). Demineralised water was used in all polymerisations. Demineralised water quality limits were set between pH 5 to pH 9 with a conductivity below 10 uS. Reactions were initiated with organic peroxide free radical initiators chosen from;

Di(2-ethylhexyl) peroxydicarbonate
Diethyl peroxydicarbonate
Lauroyl peroxide

In the following examples, six different primary protective colloids were used. Primary protective colloids 1, 2, 3 and 4 were partially hydrolysed PVAs, having the following properties:

| Primary protective colloid | Degree of hydrolysis (%) | Mp* |
|---|---|---|
| 1 | 78.5-81.5 | 170000-180000 |
| 2 | 86.6-89.5 | 150000 |
| 3 | 71-74 | 75000 |
| 4 | 70.5-73.5 | 95000 |

*Mp measured by gel permeation chromatography using 2*PL MGEL columns and guard column. THF was used as the solvent with a flow rate of 1 ml/minute. Sample detection measured at 35° C. using a refractive index detector. Polystyrene standards were used as the calibrants. PVA based colloids were first re-acetylated using acetic anhydride before GPC analysis, as described in "Compositional heterogeneity in partially hydrolysed poly(vinyl alcohol) by reversed phase liquid chromatography, Dawkins, J. et al., Polymer 40 7331-7339 (1999)"

Primary protective colloid 5 was a hydroxypropyl methyl cellulose containing 28.5% MeO, 6% HPO and having a viscosity of 40-60 mPa/s. Primary protective colloid 6 was a methyl cellulose containing 30% MeO and having a viscosity 12-18 mPa/s.

Two different commercially available secondary protective colloids were also used by way of comparison. Both were randomly hydrolysed PVAs, as follows:

| Secondary protective colloid | Degree of hydrolysis (%) | Mp |
|---|---|---|
| 6 | 54-58 | 27000 |
| 7 | 45-48 | 27000 |

Reactors were first prepared by the application of Evicas 90 (Trade Mark) antifouling agent. Agitation was set at a lower speed than the reaction speed while adding demineralised water and initiator. The reactor was sealed and purged with Nitrogen before applying a vacuum. Protective colloids were added to the reactor followed by VCM. Stirrer speed was increased to reaction speed and the reactor heated via a jacket. Heat of polymerisation was removed by the jacket or via a reflux condenser where stated. Additional demineralised water was injected depending on the recipe to ensure good heat transfer. At a specified conversion indicated by a drop in polymerisation pressure the remaining VCM was vented from the reactor before stripping the residual monomer under vacuum and high temperature. Typically K70 flexible resins were polymerised to 85% conversion, the remaining experiments from 85 to 92% conversion. The stripped PVC slurry was centrifuged to remove water. The resulting 'wet cake' was fluid bed dried before polymer samples were analysed. Polymerisation temperatures were chosen for the required K value.

K70-53° C.
K68-56.5° C.
K60-64.5° C.
K57-70° C.
K53-75.5° C.

Example 1

A series of K70 PVCs was prepared using Primary Protective Colloid 1 (500 ppm) and various secondary protective colloids (900 ppm). The results were as follows:

| Run | Secondary protective colloid | Median grain Size$^a$ (µM) | Grain size spread$^b$ (µM) | MGS/GSS Ratio | <63 (µM)$^c$ | >250 (µM)$^c$ | Cold plasticizer absorption$^d$ (%) | Apparent density (g/L)$^e$ |
|---|---|---|---|---|---|---|---|---|
| 414,485$^f$ | No secondary colloid | 191 | 118 | 1.6 | 0.6 | 18 | 18.4 | 576 |
| 421,678 | 6 | 150 | 74 | 2 | 0 | 0.67 | 33.8 | 474 |
| 414,436 | 6 | 128 | 61 | 2.1 | 0.6 | 0.01 | 30.5 | 501 |
| 414,464 | 6 | 133 | 63 | 2.1 | 0 | 0.02 | 30.6 | 504 |
| 421,593 | Monomers used to make example A | 245 | 138 | 1.8 | 0 | 47.1 | 18.4 | 570 |
| 414,481 | A | 122 | 67 | 1.8 | 1.2 | 0.01 | 38.4 | 466 |
| 421,762 | B | 131 | 75 | 1.8 | 0.4 | 0.94 | 39.4 | 483 |
| 421,570 | C | 219 | 137 | 1.6 | 0 | 33 | 20.5 | 542 |
| 421,567 | D | 220 | 137 | 1.6 | 0.6 | 33.3 | 19.6 | 516 |

$^a$Median grain size (MGS) is defined as 50% of the particle size distribution measured by laser diffraction analysis on a Beckman Coulter LS230 instrument. Test carried out in accordance with ISO 13320-1 (1999).
$^b$Grain size spread (GSS) is defined as the difference between the particle size at 85% of the distribution and the size at 15% of the distribution. Particle size distribution measured by laser diffraction analysis on a Beckman Coulter LS230 instrument. Test carried out in accordance with ISO 13320-1 (1999)
$^c$Percentile size below <63 µM and >250 µM measured by laser diffraction analysis on a Beckman Coulter LS230 instrument. Test carried out in accordance with ISO 13320-1 (1999).
$^d$Cold plasticizer absorption (CPA) test conforms to ISO 4608, and represents the porosity in the S-PVC.
$^e$Apparent density (AD) test method conforms to ISO-60 1977.
$^f$In this and the following examples, the prefix 414 in the Run number refers to a polymerisation conducted in the 250 litre reactor, whereas 421 refers to a polymerisation conducted in the 160 litre reactor.

The results show that higher levels of porosity and better control of the particle size spread can be achieved using the improved secondary protective colloid of the invention (Runs 414,481 and 421,762), compared to the example where no secondary colloid is used (Run 414,485). Also compared to standard PVA technology (Runs 421,678, 414,436 and 414,464), the secondary protective colloid according to the present invention gives a much higher porosity. When monomers used to make the improved secondary protective colloid are added directly to the polymerisation (Run 421,593) no improvement in particle size or porosity is observed. Similarly, if 2-ethylhexyl acrylate homopolymer (Run 421,570) and 2-hydroxyethyl acrylate homopolymer (Run 421,567) are used, no advantage is shown.

Example 2

Example 1 was repeated using secondary protective colloids prepared from different acrylates, with the following results:

| Run | Secondary protective colloid | Median grain Size (μM) | Grain size spread (μM) | MGS/GSS Ratio | <63 (μM) | >250 (μM) | Cold plasticiser absorption % | Apparent density (g/L) |
|---|---|---|---|---|---|---|---|---|
| 414,485 | No secondary colloid | 191 | 118 | 1.6 | 0.6 | 18 | 18.4 | 576 |
| 414,436 | 6 | 128 | 61 | 2.1 | 0.6 | 0.01 | 30.5 | 501 |
| 414,464 | 6 | 133 | 63 | 2.1 | 0 | 0.02 | 30.6 | 504 |
| 414,513 | E | 186 | 114 | 1.6 | 1.1 | 14.9 | 21.7 | 533 |
| 414,512 | F | 176 | 101 | 1.7 | 0.6 | 8.75 | 24.9 | 541 |
| 414,503 | G | 165 | 93 | 1.8 | 0.3 | 5.08 | 32.4 | 500 |
| 414,538 | H | 142 | 72 | 2 | 0.7 | 0.2 | 30.1 | 512 |
| 414,481 | A | 122 | 67 | 1.8 | 1.2 | 0.01 | 38.4 | 466 |
| 414,504 | I | 163 | 93 | 1.75 | 0.4 | 4.52 | 32.4 | 468 |

The results show that the highest levels of porosity and best control of the particle size spread is achieved when the secondary protective colloid of the invention is formed from a $C_4$ to $C_{12}$ alkyl acrylate. The preferred copolymer is formed between 2-ethylhexyl acrylate and 2-hydroxyethyl acrylate.

Example 3

Example 1 was repeated using secondary protective colloids formed from different comonomers. The following results were obtained:

| Run | Secondary protective colloid | Median grain size (μM) | Grain size spread (μM) | MGS/GSS Ratio | <63 (μM) | >250 (μM) | Cold plasticiser absorption % | Apparent density (g/L) |
|---|---|---|---|---|---|---|---|---|
| 421,814 | None | 200 | 115 | 1.7 | 0 | 20.9 | 20.5 | 554 |
| 421,678 | 6 | 150 | 74 | 2 | 0 | 0.67 | 33.8 | 474 |
| 421,762 | C | 131 | 75 | 1.8 | 0.4 | 0.94 | 39.4 | 483 |
| 421,580 | J | 164 | 86 | 1.9 | 0 | 3.8 | 35.8 | 473 |
| 421,810 | K | 174 | 97 | 1.8 | 0 | 7.9 | 32.8 | 490 |
| 421,831 | L | 140 | 72 | 2 | 0.18 | 0.7 | 36.4 | 471 |

The results show that high levels of porosity and good control of the particle size spread can be achieved using secondary protective colloids formed from hydroxyalkyl methacrylate as well as hydroxyalkyl acrylate.

Example 4

Example 1 was repeated using secondary protective colloids having different hydroxyalkyl acrylate content. The results were as follows:

| Run | Secondary protective colloid | Median grain size (μM) | Grain size spread (μM) | MGS/GSS Ratio | <63 (μM) | >250 (μM) | Cold plasticiser absorption % | Apparent density (g/L) |
|---|---|---|---|---|---|---|---|---|
| 421,814 | None | 200 | 115 | 1.7 | 0 | 20.9 | 20.5 | 554 |
| 421,678 | 6 | 150 | 74 | 2 | 0 | 0.67 | 33.8 | 474 |
| 421,567 | D | 220 | 137 | 1.6 | 0.6 | 33.3 | 19.6 | 516 |
| 421,760 | M | 195 | 108 | 1.8 | 0 | 17.9 | 28.8 | 524 |
| 421,762 | B | 131 | 75 | 1.8 | 0.4 | 0.94 | 39.4 | 483 |
| 421,761 | N | 220 | 109 | 2 | 0 | 30.1 | 25.4 | 487 |
| 421,570 | C | 219 | 137 | 1.6 | 0 | 33 | 20.5 | 542 |

The results show that the highest levels of porosity and best control of the particle size spread is achieved when the secondary protective colloid comprises from 50% to 75% by weight of hydroxyalkyl acrylate or methacrylate moieties.

Example 5

The purpose of this Example was to test an additive of the kind described in EP-A-0483051.

A series of K70 PVCs was prepared using a combination of Primary Protective Colloid 2 (160 ppm), Primary Protective Colloid 3 (500 ppm), Primary Protective Colloid 5 (70 ppm) and various secondary protective colloids (400 ppm), including SK Oligomer UMB 2005B (Trade Mark, a low molecular weight poly butyl acrylate based polymer functionalized at the polymer chain end with hydroxyl groups). The results were as follows:

| Run | Secondary protective colloid | Median grain Size (μM) | Grain size spread (μM) | MGS/GSS Ratio | <63 (μM) | >250 (μM) | Cold plasticiser absorption % | Apparent density (g/L) |
|---|---|---|---|---|---|---|---|---|
| 421,792 | No secondary colloid | 178 | 89 | 2 | 0 | 6.5 | 19.9 | 571 |
| 421,523 | 6 | 124 | 62 | 2 | 1.3 | 0 | 27.4 | 519 |
| 421,785 | UMB 2005B | 138 | 66 | 2.1 | 0 | 0.03 | 27.1 | 515 |
| 421,801 | B | 110 | 47 | 2.3 | 0.03 | 0 | 32.8 | 502 |

A further series of K70 PVCs was prepared using Primary Protective Colloid 1 (500 ppm) and various secondary protective colloids (900 ppm). The results were as follows:

| Run | Secondary protective colloid | Median grain Size (μM) | Grain size spread (μM) | MGS/GSS Ratio | <63 (μM) | >250 (μM) | Cold plasticiser absorption % | Apparent density (g/L) |
|---|---|---|---|---|---|---|---|---|
| 421,794 | * UMB 2005B | 159 | 100 | 1.6 | 0.8 | 6 | 23.2 | 517 |
| 421,814 | # No secondary colloid | 200 | 115 | 1.7 | 0 | 20.9 | 20.5 | 554 |
| 421,678 | 6 | 150 | 74 | 2 | 0 | 0.67 | 33.8 | 474 |
| 421,762 | B | 131 | 75 | 1.8 | 0.4 | 0.9 | 39.4 | 483 |
| 421,793 | B | 141 | 86 | 1.6 | 0.4 | 1.78 | 38.5 | 481 |

*730 ppm of primary protective colloid type 1 used in combination with 400 ppm of UMB 2005B. It was necessary to use a large amount of primary protective colloid to ensure sufficient particle size stability to allow for an accurate measurement of porosity.

As discussed above, WO97/08212 teaches that a low molecular weight primary protective colloid having a low degree of hydrolysis (such as Primary Protective Colloid 3) should be used with low molecular weight acrylate secondary protective colloids. When the primary colloid is replaced with one which is less effective at increasing porosity (Primary Protective Colloid 1), UMB 2005B is shown to be less effective compared to the improved secondary protective colloid of the invention.

A still further series of K70 PVCs was prepared using a combination of Primary Protective Colloid 2 (200 ppm), Primary Protective Colloid 3 (500 ppm) and Secondary Protective Colloid B or 6 (400 ppm)

| Run | Secondary protective colloid | Median grain Size (μM) | Grain size spread (μM) | MGS/GSS Ratio | <63 (μM) | >250 (μM) | Cold plasticiser absorption % | Apparent density (g/L) |
|---|---|---|---|---|---|---|---|---|
| 422,739 | B | 146 | 92 | 1.7 | 0.8 | 1.69 | 33.4 | 512 |
| 422,740 | 6 | 112 | 57 | 2 | 2 | 0 | 29.3 | 512 |

The improved secondary protective colloid of the invention is shown to give higher porosity compared to standard PVA based secondary protective colloid technology.

Example 6

A series of K53 PVCs was prepared using Primary Protective Colloid 3 (750 ppm) and various secondary protective colloids (750 ppm). The results were as follows:

| Run | Secondary protective colloid | Median grain Size (μM) | Grain size spread (μM) | MGS/GSS Ratio | <63 (μM) | >250 (μM) | Cold plasticiser absorption % | Apparent density (g/L) |
|---|---|---|---|---|---|---|---|---|
| 414,773 | 6 | 105 | 55 | 1.9 | 4 | 0 | 14.5 | 569 |
| 414,817 | UMB 2005B | 132 | 90 | 1.5 | 2.7 | 4.3 | 6.7 | 512 |
| 414,778 | 7 | 116 | 51 | 2.3 | 0.1 | 0 | 16.7 | 530 |
| 414,774 | B | 170 | 84 | 2 | 0.7 | 3.64 | 23.3 | 510 |
| 414,911 | 6 (500 ppm) | 110 | 66 | 1.7 | 3.8 | 1.6 | 11.9 | 529 |
| 414,908 | B (500 ppm) | 149 | 71 | 2.1 | 0 | 0.34 | 20.4 | 523 |

As the temperature of the polymerisation is increased, the effectiveness of the secondary colloid in terms of CPA value decreases, for a given quantity of secondary protective colloid. The results show that the improved secondary protective colloid of the invention allows high porosity to be obtained, even at a high polymerisation temperature. High MGS, low K value resins such as are obtained in this example are highly desirable for their good powder handling characteristics.

Example 7

A method to assess the internal structural homogeneity of PVC is described by Faraday, Plastics and Composite Processing and Application 18: 91-94 (1992). Samples are saturated in a VCM atmosphere, and then allowed to lose VCM at 70° C. Samples are analysed for residual VCM concentration at various time intervals in accordance with ASTM D3749-95 (2002).

The Table below shows how the polymers made in example 6 perform in terms of rate of VCM monomer loss.

| Run | Secondary Protective colloid | 1 Hour | 3 Hours | 5 Hours | 24 Hours |
|---|---|---|---|---|---|
| 414,773 | 6 | 883 | 109 | 98 | 10.4 |
| 414,778 | 7 | 395 | 56 | 18.7 | 0.26 |
| 414,774 | B | 64 | 1.3 | 0.38 | 0.07 |

It can be seen that polymer made using the improved secondary protective colloid of the invention lose VCM at a much faster rate than the polymer formed using standard secondary protective colloid technology. The combination of high porosity and excellent internal structural homogeneity can not be achieved using standard PVA based secondary protective colloid technology.

Example 8

Low molecular weight rigid PVC resins are used in a number of critical film and blow molding applications where it is essential to achieve low levels of residual monomer in the final product. Higher temperature monomer stripping can be used to achieve very low levels of VCM, but thermal degradation of the PVC may result.

In the absence of chain transfer reagents in the polymerisation process, higher polymerisation temperatures are used to obtain low molecular weight PVC. However, it is practically and economically not possible to produce low molecular weight suspension-polymerised PVC resins with the porosities typically found in the higher molecular weight resins used in flexible applications with conventional protective colloids.

A series of K53 PVCs was prepared using Primary Protective Colloid 1 (500 ppm) and various secondary protective colloids (900 ppm). The results were as follows:

| Run | Secondary protective colloid | Level of Secondary protective colloid ppm on VCM | Median grain Size (μM) | Grain size spread (μM) | MGS/ GSS Ratio | <63 (μM) | >250 (μM) | Cold plasticiser absorption % | Apparent density (g/L) |
|---|---|---|---|---|---|---|---|---|---|
| 421,904 | 6 | 900 | 154 | 79 | 2 | 0 | 1.67 | 18.2 | 564 |
| 421,894 | 6 | 1,800 | 135 | 70 | 1.9 | 0.6 | 0.28 | 16.5 | 553 |
| 421,918 | B | 900 | 172 | 85 | 2 | 0 | 4.4 | 26.2 | 524 |
| 421,912 | B | 1,800 | 169 | 85 | 2 | 0 | 4.1 | 29.7 | 496 |
| 421,898 | B | 1,800 | 136 | 67 | 2 | 0 | 0.18 | 31.1 | 484 |
| 421,937 | *6 | 1,800 | 112 | 67 | 1.7 | 4.5 | 0.7 | 16.2 | 517 |
| 421,928 | *B | 1,800 | 112 | 53 | 2.1 | 1.1 | 0 | 33.2 | 480 |

*denotes an additional use of 200 ppm Primary Protective Colloid 2

These examples show how the improved secondary protective colloid of the invention can be used to produce higher porosity, low K value resins.

Example 9

A further series of K70 PVCs was prepared to show the effect of using the improved secondary protective colloid of the invention in combination with a standard PVA based secondary colloid. In each case, Primary Protective Colloid 1 was used in an amount of 500 ppm, and the total amount of secondary protective colloid was 900 ppm.

| Run | Secondary protective colloid | Median grain Size (μM) | Grain size spread (μM) | MGS/GSS Ratio | <63 (μM) | >250 (μM) | Cold plasticiser absorption % | Apparent density (g/L) |
|---|---|---|---|---|---|---|---|---|
| 421,678 | 6 | 150 | 74 | 2 | 0 | 0.67 | 33.8 | 474 |
| 421,557 | 450 ppm 6 + 450 ppm B | 123 | 54 | 2.3 | 0 | 0.3 | 40.2 | 452 |
| 421,671 | 675 ppm 6 + 225 ppm B | 140 | 64 | 2.2 | 0 | 0.02 | 35.3 | 490 |
| 421,668 | 855 ppm 6 + 45 ppm B | 142 | 72 | 2 | 0.7 | 0.2 | 33.5 | 490 |
| 421,762 | B | 131 | 75 | 1.8 | 0.4 | 0.9 | 39.4 | 483 |
| 421,793 | B | 141 | 86 | 1.6 | 0.4 | 1.78 | 38.5 | 481 |

The results show that combinations of standard PVA's and improved secondary protective colloid can be used together with the result of producing high CPA and very tight particle size distributions. As little as 25% improved secondary protective colloid replacing traditional PVA can be seen to significantly increase porosity.

Example 10

The initial colour of PVC is influenced by a number of process variables. It is known that the thermal stability of standard secondary protective colloids must be controlled during production to avoid variation in colour resulting from thermal degradation of the colloid. A comparison of the inherent thermal stability of the improved secondary colloid and standard technology is shown below. A thin film of secondary colloid was placed in an aluminium dish and dried at 180° C. for 1 hour.

Colour was measured using the L*,a*,b* system, where L* refers to the white to black component, a the red to green component and b the yellow to blue component of colour.

|  | L* | a* | b* |
|---|---|---|---|
| Aluminium dish | 93 | −0.3 | 0.04 |
| 6 | 55.8 | 19.5 | 50.3 |
| B | 90.7 | −0.8 | 1.3 |

The results show a large change in colour of the prior art PVA colloid, showing poor thermal stability. However, the secondary protective colloid according to the invention underwent very little colour change, demonstrating improved thermal stability.

Example 11

The purpose of this example was to assess whether PVC resin made with the secondary protective colloid of the invention also has improved colour. Unstabilised K53 polymer was heated for 5 minutes at 180° C. in an oven and the powder colour change measured

| Secondary protective colloid | Δ L* | Δ a* | Δ b* |
|---|---|---|---|
| 6 | 16.9 | 7.73 | 23.4 |
| B | 15.5 | 7.2 | 16.2 |

The results show that polymer made using the improved secondary protective colloid shows less discolouration than polymer made using the standard PVA technology.

Example 12

Although measuring polymer powder colour is a simple way to assess colour, the results do not always correlate with results observed when PVC is processed in a true industrial formulation. Therefore K70 polymer made with a standard PVA secondary was compared to polymer made using the improved colloid of the invention in Ca/Zn stabilised plasticised formulation. In each case, the formulation was as follows:

|  | phr |
|---|---|
| PVC | 100 |
| DOP[a] | 53.5 |
| ESBO[b] | 8 |
| Calcium/Zinc one pack[c] | 1.2 |

[a]Bis (2-ethylhexyl) phthalate plasticiser
[b]Epoxidised soya bean oil (Trade name Drapex 392)
[c]Commercial stabilizer system - mixture of primary PVC stabilizers based on calcium and zinc carboxylates, formulated with other PVC castabilisers.

Formulations were first milled on a two roll mill then compression molded. The Yellow index of the final plaque was assessed.

| Secondary protective colloid | Yellow Index ASTM 1925 |
|---|---|
| 6 | 20 |
| B | 16.6 |

The results show that polymer made using the improved secondary protective colloid of the invention has better initial colour compared to PVC made with the standard PVA technology.

Example 13

A similar comparison to example 12 was carried out using K57 PVC samples. The colour performance was assessed in an unplasticised Tin based stabilised bottle formulation.

|  | Secondary protective colloid | Yellow Index ASTM 1925 |
|---|---|---|
| 421,526 | 6 | 14.4 |
| 421,527 | B | 12.1 |

The results again show that polymer made using the improved secondary protective colloid of the invention has better initial colour compared to PVC made with the standard PVA technology.

Example 14

In certain crystal clear applications of fabricated PVC articles, the amount of water absorbed by the polymer is very important. Where PVC is used in contact with water, it is desirable that water is not absorbed, turning the PVC translucent or hazy and therefore losing the good optical properties of PVC. The amount of water absorbed by suspension polymerized PVC is influenced by a number of process variables.

Two K70 polymers were prepared with different secondary protective colloids, and formulated as follows:

| S-PVC | 100 phr |
|---|---|
| DINP[a] plasticiser | 60 phr |
| Barium/Zinc stabiliser | 2 phr |
| one pack | |

[a]Di isononyl phthalate

Samples were prepared on a 2 roll mill (160° C./150° C.), and then immersed in demineralised water at 50° C. After certain periods of time, samples were removed and the amount of light transmitted through the sample was measured on a UV/Visible spectrometer at 600 nm. Results are expressed as a % light transmitted relative to the amount of light transmitted before immersion in water.

| Secondary protective Colloid | 0 Hours | 24 Hours | 48 Hours | 168 Hours |
|---|---|---|---|---|
| B | 100 | 50 | 38 | 19 |
| 6 | 100 | 27 | 19 | 5 |

The results show that polymer made using the secondary protective colloid of the invention becomes hazy more slowly than polymer made using standard PVA technology, indicating a slower rate of water absorption.

Example 15

U.S. Pat. No. 5,977,273 and EP-A-705847 describe the use of ionically modified protective colloids, having a high cloud point temperature, which can be used in high productivity hot water charge processes. The following example shows that the improved secondary protective colloid of the present invention, which has no discernable cloud point in the temperature range used in the commercial production of PVC by suspension polymerisation, gives excellent performance in hot water charge processes. The example shows data from a K70 polymerisation. The reactor was charged with a small quantity of the charge water, protective colloids and free radical initiator and VCM. The remaining water was charged to the reactor as hot water at 85° C. in a 2 minute time period.

| Run | Primary protective colloid | Secondary protective colloid | Median grain Size (μM) | Grain size spread (μM) | MGS/GSS Ratio | <63 (μM) | >250 (μM) | Cold plasticiser absorption % | Apparent density (g/L) |
|---|---|---|---|---|---|---|---|---|---|
| 421,816 | 4 | 6 | 186 | 106 | 1.75 | 0 | 14.6 | 30.8 | 507 |
| 421,818 | 4 | B | 120 | 65 | 1.85 | 1.2 | 0 | 32.4 | 492 |
| 421,841 | 3 | 6 | 265 | 1,272 | 0.21 | 4.8 | 50.9 | 26.6 | 423 |

The results show that polymer made using the improved secondary protective colloid of the invention gives better stability under these high productivity conditions. The particle size distribution is tighter and porosity higher using the colloid of the invention.

Example 16

A necessary requirement of any improved secondary protective colloid for the suspension polymerisation of vinyl chloride is the ability to perform under high productivity, conditions. Suspension polymerisation is generally carried out as a batch process, so the reaction time of each batch must be reduced to a minimum to improve the plant's productivity. Using a single initiator at a fixed temperature, the evolution of heat tends to peak towards the later stages of polymerisation, when all free liquid VCM is consumed. A more even rate of heat evolution can be achieved by the use of a combination of initiators with different half life temperatures. It is common practice to remove the heat of polymerisation by the combination of a cooling jacket or coil on the reaction vessel and an external reflux condenser.

US patent application US 2003/0162927 and U.S. Pat. No. 4,136,242 teach that the amount of heat removed via a reflux condenser should not start until at least 15% conversion of VCM to PVC has occurred, to prevent condenser fouling and the production of coarse particles. An improved secondary protective colloid which would provide greater PVC particle size stability under early condensing action would have an advantage over traditional PVA based technology.

To simulate the effects of very high initial monomer reflux on the quality of S-PVC, a reactor fitted with a reflux condenser was operated in such a way that the reactor jacket was shown to input heat to the system continuously, whilst the condenser removed heat continuously, maintaining a constant set point temperature. Experimentally inert gases which accumulate in the reflux condenser at the start of polymerisation were vented from the system at 4° C. below the set point to allow for heavy reflux from the start of polymerisation.

| Example | Secondary protective colloid | Median grain Size (μM) | grain size spread (μM) | MGS/GSS Ratio | <63 (μM) | >250 (μM) | Cold plasticiser absorption % | Apparent density (g/L) |
|---|---|---|---|---|---|---|---|---|
| 4,804,234 | 6 | 224 | 163 | 1.4 | 0 | 37.5 | 17.9 | 534 |
| 4,804,235 | B | 213 | 148 | 1.4 | 0 | 31.8 | 23.4 | 532 |
| 4,804,269 | B 125 ppm & 6 125 ppm | 168 | 89 | 1..9 | 0 | 5.2 | 20 | 550 |

The results obtained using the secondary protective colloid according to the invention are somewhat improved relative to the prior art technology under these high productivity conditions. Surprisingly, a combination of the secondary colloid of the invention and the prior art PVA colloid are shown to work in a synergistic manner, leading to very good particle size control under high productivity conditions.

Example 18

It has been shown that the productivity of batch processes for the suspension polymerisation of vinyl chloride can be improved by the addition of further VCM after polymerisation has started. This technique takes advantage of the fact that a volume contraction occurs in the batch reactor, owing to the difference in density between monomer and polymer. Industrially, this approach has limited application, as the current PVA based recipe technology tends to give a wide particle size distribution and very low porosity, making VCM removal difficult.

In this example, a series of K68 rigid polymers was prepared with further VCM being added at different stages in the polymerisation process.

| Additional VCM charged and time | Secondary Protective colloid | | MGS | GSS | MGS/GSS Ratio | <63 (μM) | >250 (μM) | Cold plasticiser absorption % | Apparent density (g/L) |
|---|---|---|---|---|---|---|---|---|---|
| Control-No additional VCM added | 6 | Average of 3 results | 160 | 86 | 1.9 | 0 | 9.8 | 18.4 | 553 |
| 10% extra VCM @ 65% conversion | B | 421773 | 182 | 92 | 2 | 1.2 | 8.7 | 18.2 | 565 |
| 10% extra VCM @ 60% conversion | B | 421779 | 173 | 92 | 1.9 | 0.9 | 6.2 | 17.9 | 551 |
| 10% extra VCM @ 35~40% conversion. One injection | B | 421781 | 228 | 123 | 1.85 | 0 | 36.1 | 20.5 | 548 |
| 10% extra VCM @ 35~40% conversion. Added slowly over ~35 to 65 % conversion | B | 421782 | 163 | 86 | 1.9 | 1.1 | 3.2 | 17.5 | 546 |

The results show that a 10% increase in the amount of monomer polymerised in a batch can be achieved while maintaining the desired polymer properties.

The invention claimed is:

1. A process for polymerizing vinyl chloride monomer, comprising subjecting vinyl chloride monomer to suspension polymerization in the presences of a copolymer of (i) an alkyl acrylate or alkyl methacrylate and (ii) a hydroxyalkyl acrylate or hydroxyalkyl methacrylate as a secondary type protective colloid, wherein the alkyl group of said alkyl acrylate or alkyl methacrylate is a $C_3$ to $C_{16}$ alkyl group, wherein said copolymer comprises from 20% to 50% by weight of alkyl acrylate or methacrylate moieties and from 80% to 50% by weight of hydroxyalkyl acrylate or methacrylate moieties and wherein said copolymer has a peak average molecular weight as determined by reversed phase liquid chromatography of from 5000 to 50000.

2. The process according to claim 1, wherein the alkyl group of said alkyl acrylate or alkyl methacrylate is a 2-ethylhexyl group.

3. The process according to claim 1, wherein the hydroxyalkyl group of said hydroxyalkyl acrylate or hydroxyalkyl methacrylate is a $C_1$ to $C_6$ hydroxyalkyl group.

4. The process according to claim 3, wherein the hydroxyalkyl group of said hydroxyalkyl acrylate or hydroxyalkyl methacrylate is a hydroxyethyl group.

5. The process according to claim 1, wherein said copolymer comprises from 25% to 50% by weight of alkyl acrylate or methacrylate moieties and from 75% to 50% by weight of hydroxyalkyl acrylate or methacrylate moieties.

6. The process according to claim 1, wherein said copolymer is used in an amount of from 50 to 2000 ppm by weight of vinyl chloride monomer.

7. The process according to claim 1, wherein said copolymer has a peak average molecular weight as determined by reversed phase quid chromatography of from 6000 to 20000.

8. The process according to claim 1, wherein said copolymer has a peak average molecular weight as determined by reversed phase liquid chromatography of from 8000 to 14000.

9. The process according to claim 6, wherein said copolymer is used in an amount of from 100 to 1500 ppm by weight of vinyl chloride monomer.

10. The process according to claim 6, wherein said copolymer is used in an amount of from 200 to 1000 ppm by weight of vinyl chloride monomer.

* * * * *